(12) United States Patent
Leporini et al.

(10) Patent No.: US 8,543,997 B2
(45) Date of Patent: Sep. 24, 2013

(54) SECURE DYNAMIC LOADING

(75) Inventors: David Leporini, Rungis (FR); Vincent Prunet, Roquefort-les-Pins (FR); Daniel Le Metayer, Ngylan (FR)

(73) Assignee: Trusted Logic Mobility (SAS), Meudon (FR)

( * ) Notice: Subject to any disclaimer, the term of this patent is extended or adjusted under 35 U.S.C. 154(b) by 1569 days.

(21) Appl. No.: 11/794,481

(22) PCT Filed: Dec. 27, 2005

(86) PCT No.: PCT/FR2005/003290
§ 371 (c)(1),
(2), (4) Date: Jun. 29, 2007

(87) PCT Pub. No.: WO2006/072705
PCT Pub. Date: Jul. 13, 2006

(65) Prior Publication Data
US 2009/0282397 A1    Nov. 12, 2009

(30) Foreign Application Priority Data

Dec. 31, 2004 (FR) .................................. 04 14119

(51) Int. Cl.
*G06F 9/445* (2006.01)
(52) U.S. Cl.
USPC ........................................................ 717/174
(58) Field of Classification Search
None
See application file for complete search history.

(56) References Cited

U.S. PATENT DOCUMENTS

| | | | |
|---|---|---|---|
| 5,699,431 A * | 12/1997 | Van Oorschot et al. | 380/30 |
| 6,327,652 B1 * | 12/2001 | England et al. | 713/2 |
| 6,449,720 B1 * | 9/2002 | Sprague et al. | 713/171 |
| 7,140,035 B1 * | 11/2006 | Karch | 726/1 |
| 2002/0108050 A1 * | 8/2002 | Raley et al. | 713/193 |
| 2002/0157002 A1 * | 10/2002 | Messerges et al. | 713/155 |
| 2003/0159070 A1 * | 8/2003 | Mayer et al. | 713/201 |
| 2003/0188173 A1 * | 10/2003 | Zimmer et al. | 713/189 |
| 2003/0233539 A1 * | 12/2003 | Tardo et al. | 713/153 |
| 2004/0015958 A1 * | 1/2004 | Veil et al. | 717/174 |
| 2004/0083369 A1 * | 4/2004 | Erlingsson et al. | 713/176 |
| 2004/0141190 A1 * | 7/2004 | Akashi | 358/1.6 |
| 2004/0205109 A1 * | 10/2004 | Hara et al. | 709/201 |
| 2004/0221175 A1 * | 11/2004 | Athens et al. | 713/201 |
| 2005/0183138 A1 * | 8/2005 | Phillips et al. | 726/11 |
| 2005/0207763 A1 * | 9/2005 | Chihara | 399/24 |
| 2005/0235362 A1 * | 10/2005 | England et al. | 726/27 |
| 2006/0047859 A1 * | 3/2006 | Cavalaris et al. | 710/8 |
| 2006/0053490 A1 * | 3/2006 | Herz et al. | 726/23 |
| 2009/0150525 A1 * | 6/2009 | Edgett et al. | 709/220 |

FOREIGN PATENT DOCUMENTS

WO    03/083626 A    10/2003

* cited by examiner

*Primary Examiner* — Wei Zhen
*Assistant Examiner* — Adam R Banes
(74) *Attorney, Agent, or Firm* — Young & Thompson

(57) ABSTRACT

A method for loading, installing and running software, called loading units, having different levels of confidence by a data processing unit (1). The method includes at least associating at least one structure of information data concerning security requirements and characteristics of this loading unit with each loading unit (2, 3, 7); associating a dynamic data structure (10) representative of the state of security in the data processing unit (1) to the data processing unit (1); validating the security requirements and characteristics of each loading unit (2, 3, 7) with regard to the state in the data processing unit (1) contained in the dynamic data structure (10via an autonomous security module (9), and; if the validation is positive, authorizing, via the security module (9), the loading, installation or running of the loading unit (2, 3, 7).

18 Claims, 2 Drawing Sheets

SECURE DYNAMIC LOADING

The present invention relates to a method for loading and executing items of software, referred to as loading units, having different confidentiality levels using a data-processing unit.

It also relates to a data-processing unit which is capable of loading and executing items of software which have different confidentiality levels in the form of loading units, the data-processing unit comprising, in addition to a central processing unit, a secure core which is contained in the lowest layer of the operating system and a secure physical zone in the most secure portion of the hardware architecture of this data-processing unit.

It is known that the security of a system is dependent on a chain of measures and that it is as weak as the weakest link of this chain.

For a data system which comprises a plurality of items of software, the security of the system is therefore dependent on the security which may or may not be provided by each item of software.

The very first security element to be taken into account in a system of this type is the integrity of the items of software which are intended to be executed on this system.

An item of software is said to be integral when it has not been modified by external elements, such as, for example, a virus, in order to bring about operation which is different from the normal operation envisaged by the designer thereof.

In order to provide this integrity with operating systems, solutions based on the authentication of the application when it is loaded have been proposed. These solutions must be accompanied by a process for validation and certification of the application before it is downloaded.

Furthermore, security systems are known which unify the problems of specification and interpretation of security policies, access control and authorisation. These systems are known to the person skilled in the art as a "Confidentiality Control System".

A system of this type is constituted by a language for describing the operations which must be controlled by the system, a mechanism for identifying entities which are authorised to carry out these operations, a language specifying the policies of the applications which govern the operations that the entities are authorised to carry out, a language for the authorisation certificates which allow an operation to be delegated from one entity to another entity, and finally an interpreter which allows the requests for operations transmitted by the entities to be validated, based on a specific policy and a group of authorisation certificates.

These Confidentiality Control Systems are used principally in distributed environments in order to standardise the languages of the security and authorisation policies and to decentralise these policies.

Using these systems, the security policy of a specific application is no longer static but instead dynamic owing to the use and modification of the authorisation certificates.

However, these Confidentiality Control Systems lack flexibility because they do not respond to the significant needs of current open data systems.

In this manner, it is not possible to implement and provide coherence for security policies which originate from the applications themselves, which security policies are referred to as "discretionary", with the same level of confidentiality as the security policies which are fixed by the operating system, which security policies are referred to as "mandatory".

The object of the invention is therefore to overcome this disadvantage by providing a method and a system which are capable of downloading and executing software applications, providing a security policy which is dynamic over time and which is coherent both for the data system and for downloaded applications.

The invention relates to a method for loading, installing and executing items of software, referred to as loading units, having different confidentiality levels using a data-processing unit, characterised in that it involves at least associating, with each loading unit, at least one information data structure relating to the security requirements and features of this loading unit and associating with the data-processing unit a dynamic data structure which is representative of the current security status of the data-processing unit, the dynamic data structure being updated by means of the security module following a change in the internal status of the processing unit and validating the security requirements and features of each loading unit with respect to the current status of the data-processing unit contained in the dynamic data structure using an autonomous security module and, if the validation is positive, authorising, using the security module, the loading, installation or execution of the loading unit.

Other features are:
each loading unit is associated with
a data structure of identification information of this loading unit;
a data structure of installation restriction; and
a data structure which constitutes a set of security policy rules,
the information data structure of identification information of this loading unit is formed by a list of attributes which characterise this loading unit comprising at least one coded reference from the list of coded references of identity, site of origin, authentication certificate, integrity information, type of functionality provided, security level, responsible organisation,
the data structure of installation restriction is formed by a list of attributes which define the installation conditions of the loading unit, the list of attributes comprising at least the explicit expression of the restrictions required for installation,
the data structure which constitutes a set of security policy rules comprises at least:
a reference for access to one or more other resources;
a reference to one or more loading units, the data structure which constitutes a set of security policy rules being read-accessible both during a loading step and during an execution step,
the dynamic data structure which is representative of the current status of the data-processing unit comprises at least data which are representative of absolute information, such as a minimum confidentiality level, and data which are representative of relative information, such as the current security level linked to native or non-authenticated applications,
each loading unit is formed by a software component which can be installed in the memory, the installable software component referring to any component of the operating system, other than the secure core, from the data-processing unit to any application which is executed thereby.

Another aspect is a data-processing unit which is capable of loading, installing and executing items of software, referred to as loading units, having different confidentiality levels, the data-processing unit comprising, in addition to a central processing unit, a secure core which is contained in the lowest layer of the operating system and a secure physical zone which is the most secure portion of the hardware architecture of this data-processing unit, characterised in that it further comprises a security module which is installed in the secure physical zone, the security module carrying out in an autonomous manner the functions of:

installing new loading units, controlling and implementing security policy rules, such as attributing and controlling access rights in accordance with the confidentiality level of each loading unit, maintaining the current status and the integrity of the system in accordance with the components of the operating system and loading units, and verifying the restrictions defined by a data structure of installation restrictions, associated with each loading unit.

Other features of this aspect are:

the security module, following the installation of this module, provides autonomous control at least of the steps:

for changing the internal status of the system;

for requesting access to the system resources;

for requesting installation of each loading unit on the system, in addition to absolute and relative information, the security module controls any new event listed in a dynamic data structure which is representative of the current status of the operating system unit, the security module controlling and updating a variable of the current confidentiality level of the system in accordance with events which arise, such as the detection of an attack, modification of the confidentiality status after installing or uninstalling a loading unit, upon a request for installation of a loading unit, the security module carries out a verification of the conditions relating to the identity of the loading unit, based on an information data structure for identification of this loading unit, the verification operations involving at least:

verifying, based on the identifier thereof, that the site of origin which accommodates the loading unit is included amongst the authorised sites;

verifying the certificate for authentication of the identity of the loading unit;

verifying the integrity of the loading unit;

verifying, with reference to a minimum level of confidentiality, that the confidentiality level associated with the loading unit does not prohibit the installation of the loading unit;

verifying, with reference to a list of prohibited functionalities, that the functionality of the loading unit does not belong to this list and does not prohibit the installation of this loading unit;

verifying, based on its identifier of the site of origin which accommodates the loading unit, that the identity of the distributor of the loading unit does not prohibit the installation of the loading unit, following a request for installation of a loading unit and in the presence of a non-empty list of installation restrictions, the security module further carries out:

a call to the point of entry of the loading unit in order to execute a plurality of verification operations specific to the loading unit, such as verification of integrity of data or portions of the code of the loading unit, initialisation of specific data of the loading unit;

verifying the presence of components in the system or in the loading unit corresponding to positive attributes and the absence of components or loading unit corresponding to negative attributes, verification in the presence of a non-empty list of installation restrictions involves direct verification of the installation restrictions based on one or more lists of restrictions attached to different loading units and/or indirect verification based on a delegation of authorisation of the installation restriction rules which are obtained by means of resolution, upon a request for installation of a loading unit and in the presence of a data structure which constitutes a non-empty set of security policy rules, the security module carries out verification of the acceptability of the requests from the loading unit, the requests being able to comprise requests for access to resources of the system and the list of loading units which are capable of calling at least one of the corresponding points of entry, when the verification of the installation restrictions is carried out by means of the indirect verification based on a delegation of translation authorisation, the security module carries out the resolution of the rules relating to the loading unit which is conditional and which is subject to indirect verification, in order to determine the acceptability of the requests from the loading unit which is conditional, following verification at the true value of all the preceding verification operations, the security module authorises the installation of the loading unit, under the authority of the central processing unit of the data-processing unit, otherwise, in the absence of verification at the true value of one of the preceding verification operations, the security module prohibits the installation of the loading unit, the refusal of installation being able to bring about a signal at the man/machine interface associated with the processing unit, and the security module is installed in the secure physical zone by means of the secure core of the operating system, the installed security module being verified in terms of its integrity by an integrity verification mechanism during the starting sequence of the processing unit.

The invention will be better understood from a reading of the following description, given purely by way of example and with reference to the appended drawings, in which.

Figure 1:
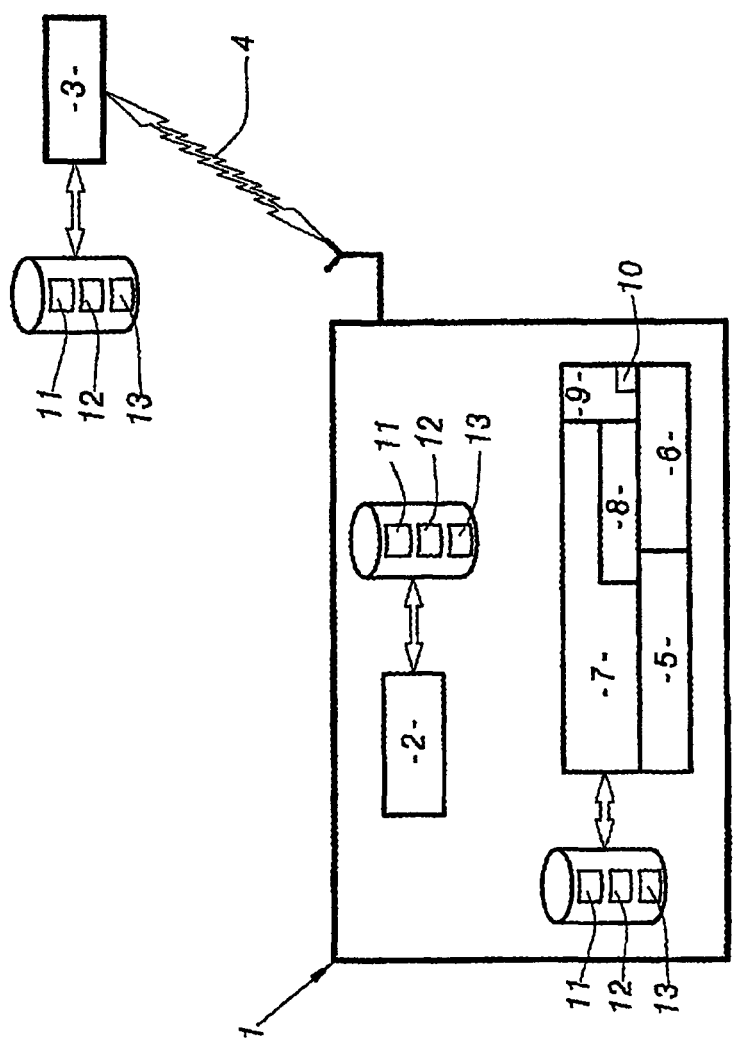
FIG. 1 is a block diagram of a data processing system according to an embodiment of the invention illustrated in the layered structure thereof.

With reference to FIG. 1, a data-processing unit 1 is intended to execute different items of software 2, 3 which have different security requirements.

This unit 1 is, for example, a workstation or a payment terminal or a mobile telephone.

The items of software which can be executed on this unit 1 are permanently loaded, such as the item of software 2, or can be downloaded using a data communication means 4, such as the item of software 3.

The unit 1 comprises, in its hardware architecture, a central processing unit 5 which is responsible for carrying out the instructions from the items of software and a secure physical storage zone 6. This secure zone 6 is at the very least a storage zone which has restricted and controlled access conditions. In order to promote the security of the zone 6, access control hardware mechanisms which are well known to the person skilled in the art can further be implemented. It is the most secure portion of the hardware structure.

In order to ensure operation of the unit 1, an operating system 7 is installed in order to control the hardware resources of the unit 1.

This operating system 7 comprises, in particular, in the lowest layer thereof, a secure core 8. This is responsible for providing the security for the processing unit 1 and in particular for ensuring that the access conditions of the secure zone 6 are complied with.

In a normal operating mode of the unit 1, the secure core 8 is executed as soon as the operating system is launched in order to prevent any interference dangerous for the security of the system during this starting phase.

A security module 9 is installed in the secure zone 6.

This security module 9, once installed, is responsible for the security of the unit 1 and in particular for providing the necessary security verification operations before the installation of a new component and verifying that the rules of the security policy of the unit 1 are complied with.

This security module 9 comprises a data structure 10 which is referred to as "Etat Courant du Système" or ECS (Current System Status), and which is intended to receive information relating to the security status of the unit 1.

The current system status 10 corresponds to the internal security status of the unit 1, as maintained by the security module 9. It includes absolute information, such as, for example, a minimum confidentiality level and information relating to the current security level, such as, for example, the presence of native or non-authenticated software installed in the unit 1. This ECS data structure 10 is therefore dynamic in that it develops over time with the development of the security status of the processing unit 1.

The items of software 2 and 3 and the components of the operating system 7 other than the secure core 8 are referred to in the remainder of this description and in an undifferentiated manner as "loading units". These are therefore software components which are installed or able to be installed in the memory of the processing unit 1.

In the remainder of this text, installation is intended to refer to all the following three phases, alone or in combination:
  (down) loading which involves transferring the loading unit to the processing unit 1,
  actual installation which involves placing the processing unit 1 and the loading unit in a state in which the loading unit can be executed,
  executing the loading unit on the processing unit 1.

Each loading unit 2, 3, 7 is associated with three data structures which define the security information of this loading unit in terms of requirements and features.

In this manner, each loading unit 2, 3, 7 is associated with a data structure 11 which is referred to as "Informations d'Identification de l'Unité" or IIU (Unit Identification Information) and which contains a list of attributes which characterise this loading unit 2, 3, 7. For example, this IIU data structure 11 contains, in the form of encoded reference, the identity, the site of origin, the authentication certificate, integrity information, the type of functionalities provided, the security level, the organisation responsible, or any other item of relevant information for characterising the loading unit 2,3,7.

Each loading unit 2, 3, 7 is also associated with a second data structure 12 which is referred to as a "Liste des Contraintes d'Installation" or LCI (list of installation restrictions).

This LCI data structure 12 defines the non-ambiguous expression of the restrictions required for loading, actual installation of and executing the loading unit. That is to say, the change, installation or execution of the loading unit is carried out only if each restriction is validated by the security module 9. These restrictions can be expressed using a dedicated expression language or, more simply, take the form of a list of attributes associated with a negative or positive sign. For example, a loading unit associated with the LCI 12 [+name VM; −native type; +level TOP] can be installed only if a component having the name VM exists on the unit 1 and if there are also no native components and the current security level of the unit 1 is TOP.

When the conditions of the LCI 12 are met, the security module 9 authorises the loading, installation or execution of the loading unit. However, these restrictions must be complied with even during the subsequent loading of new components, that is to say, for the entire period during which the loading unit is installed on the unit 1.

The LCI data structure 12 may also, but optionally, comprise a point of entry which corresponds to a processing operation which must be carried out by the loading unit itself when it is actually installed.

Finally, each loading unit 2, 3, 7 is also associated with a third data structure 13 which is referred to as "Règles de Politique de Sécurité" or RPS (Security Policy Rules).

This RPS data structure 13 defines the requests of a loading unit, such as the access desired to specific resources or to other loading units.

This RPS data structure 13 is used at the time of loading and actual installation in order to detect the access requests which are impossible to comply with, and at the time of execution, causing the security module 9 to intervene in exchanges between loading units.

The IIU data structures 11, LCI data structures 12 and RPS data structures 13 are in the form of files which contain rules and security information entered by a security administrator of the unit 1 and/or trusted third parties.

Figure 2:
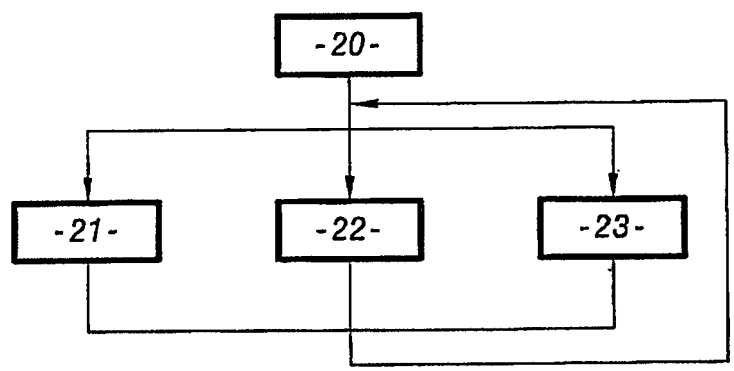
FIG. 2 is a flow chart of the security control operation flows.

The operation of the unit 1 will now be described with reference to FIG. 2.

During the actual installation of the unit 1, the security module 9 is installed at 20 in the secure zone 6 by the secure core 8. Furthermore, the secure core 8 verifies the integrity of the security module 9. This secure installation process is well known to the person skilled in the art in that it is based on hierarchical and/or linked installation processes in which each level is installed only after verification of the level immediately below.

Based on this installation, the security module 9 is considered to be the software component which is trusted in the unit 1 and which renders it secure. In this manner, it validates the security requirements and features of each loading unit 2, 3, 7 before the loading, installation or execution thereof is authorised.

Then, each time the internal status of the unit 1 changes, the security module 9 updates the data structure 10 "Current System Status" at 21 in a secure manner.

A change in status may in particular correspond to an event which affects the current confidentiality level of the unit 1. For example, the detection of an attack downgrades the confidentiality level. In the same manner, the actual installation of a new loading unit 2, 3, 7 launches a new calculation by the security module 9 of the confidentiality level, this calculation possibly being, for example, the minimum from the confidentiality levels associated with the loading units 2, 3, 7 installed.

The security module 9 receives and also validates at 22 the requests for access to the sensitive resources of the unit 1. It verifies in particular that each request carried out by a loading unit is valid in view of the rules set out in the RPS data structure 13 corresponding to this loading unit.

If a request is refused, this may be silent or indeed signalled to the user of the unit 1 by any appropriate means.

The security module is also called at 23 upon each request for installation of a new loading unit.

Figure 3:
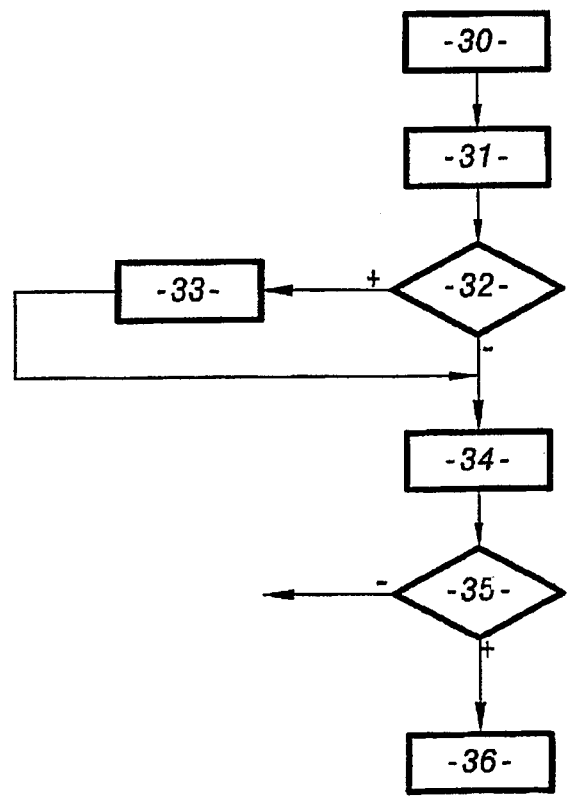
FIG. 3 is a flow chart of the loading and the installation of an item of software.

During an installation operation, the security module 9 carries out verification and validation operations, FIG. 3.

It verifies at 30 that the conditions relating to the identity of the loading unit contained in the IIU data structure 11 are met.

By way of example, and in accordance with the information contained in the IIU 11, the security module 9 verifies:

that the site of origin is included amongst the authorised sites, that the authentication certificate of the loading unit is valid, that the loading unit is integral, that the confidentiality level thereof is compatible with the general confidentiality level of the unit 1 and/or with the minimum confidentiality levels of the loading units which are already installed, that the loading unit does not require prohibited functionalities, that the entity responsible for the loading unit is not included in a list of forbidden entities,

. . .

Then, the security module 9 verifies at 31 that the conditions defined in the data structure "List of installation restrictions" 12 are complied with by the current status of the unit 1 contained in the ECS data structure 10. This verification is, of course, only carried out if this data structure is not empty.

If the LCI data structure 12 contains a point of entry, step 32, this is called at 33 in order to allow the execution of verification operations programmed by the developer of the loading unit.

A specific case for verification of the restrictions contained in the LCI data structure 12 relates to the loading units referred to as conditional. These are loading units whose installation rules are dependent on rules belonging to other loading units. For example, a restriction relating to such a loading unit A could be "the installation of the loading unit A is authorised only if loading unit B is installed and authorises the installation of unit A".

These conditional restrictions are resolved by the security module 9 which therefore analyses whether these conditions are met.

Then, the security module 9 verifies at 34 the acceptability of the requests of the loading unit contained in the data structure 13 thereof "Security Policy Rules".

In the specific instance that this structure is empty, that is to say, does not contain any requests, this step 34 is not implemented.

In particular, it verifies that the requests for access to resources or to other loading units can be granted.

In the case of conditional requests linked to a delegation of authorisation of one or more RPS data structures 13 which belong to other loading units, the security module 9 resolves these conditions in order to determine the acceptability of these requests.

If all the preceding verification operations have been found to be positive, step 35, the security module 9 accepts at 36 the loading, installation and/or execution of the loading unit.

Otherwise, this loading and/or installation and/or execution are refused by the security module 9. This refusal can be signalled to the requester by any means.

A method is thus described for loading, installing and executing items of software, referred to as loading units, having different confidentiality levels, using a data-processing unit 1, and involving at least:

associating with each loading unit 2, 3, 7 an information data structure 11 for identifying this loading unit;

a data structure 12 for restricting installation; and a data structure 13 which constitutes a set of security policy rules; and associating with the data-processing unit 1 a dynamic data structure 10 which is representative of the current security status of the data-processing unit;

applying the installation restrictions and the security policy rules, verifying and updating the dynamic data structure 10 and establishing an interactive dialogue between each loading unit 2, 3, 7 and the dynamic data structure 10 using an autonomous security module 9 after installation.

The method thus described advantageously allows software applications to be downloaded and executed, providing a security policy which is dynamic over time and which is coherent, both for the data system and for the downloaded applications.

All the requests for loading and the occurrences of communication between components are carried out through the security module.

The discretionary security policies of the loading units are therefore processed in a manner which is as secure as the mandatory policies of the operating system.

Furthermore, the factors linked to the status of the system when a loading unit is installed are taken into account via the LCI data structures and, optionally, provided to this loading unit using the ECS data structure. In this manner, the factors linked to the status of the system, such as the current security level, the other applications present, etc. are taken into account during the loading, installation and execution of each loading unit.

Another advantage of the invention is to make it possible to ensure that, for each application loaded, that is to say, each loading unit, that the system which receives it, that is to say, the processing unit, is in an adequate security status with respect to its requirements. For example, a sensitive application which manipulates cryptographic keys requires knowledge of the security status of the system before downloading or using the cryptographic keys thereof.

The invention claimed is:

1. A method for loading, installing and executing items of software, referred to as loading units, having different confidentiality levels using a data-processing unit, involving at least:

associating, with each loading unit, at least one information data structure relating to security requirements and features of a loading unit; and associating with the data-processing unit a dynamic data structure which is representative of a current security status of the data-processing unit, the dynamic data structure being updated by a security module following a change in an internal status of the processing unit and a change of status of each of the loading units; and validating the security requirements and features of each loading unit with respect to a current status of the data-processing unit contained in the dynamic data structure using an autonomous security module, the autonomous security module being separate from each of the loading units; and, upon the validation being positive, authorizing, using the security module, the loading, installation or execution of the loading unit.

2. The method according to claim 1, wherein each loading unit is associated with a data structure of identification information of the loading unit;

a data structure of installation restriction; and a data structure which constitutes a set of security policy rules.

3. The method according to claim 2, wherein the data structure of identification information of this loading unit is formed by a list of attributes which characterize the loading unit comprising at least one coded reference from a list of coded references of identity, site of origin, authentication certificate, integrity information, type of functionality provided, security level, responsible organization.

4. The method according to claim 2, wherein the data structure of installation restriction is formed by a list of attributes which define installation conditions of the loading unit, the list of attributes comprising at least the explicit expression of the restrictions required for installation.

5. The method according to claim 2, wherein the data structure which constitutes a set of security policy rules comprises at least:
   a reference for access to one or more resources; and
   a reference to one or more loading units, the data structure which constitutes a set of security policy rules being read-accessible both during a loading step and during an execution step.

6. The method according to claim 1, wherein the dynamic data structure which is representative of the current status of the data-processing unit comprises at least data representative of absolute information including a minimum confidentiality level, and data representative of relative information including a current security level linked to native or non-authenticated applications.

7. The method according to claim 1, wherein each loading unit is formed by a software component installed in a memory, the installable software component referring to any component of an operating system, other than a secure core, from the data-processing unit to any application which is executed thereby.

8. A data-processing unit loading, installing and executing items of software, referred to as loading units, having different confidentiality levels, the data-processing unit comprising, in addition to a central processing unit, a secure core which is contained in a lowest layer of an operating system and a secure physical zone which is a most secure portion of a hardware architecture of this data-processing unit, further comprising a security module which is installed in the secure physical zone, the security module carrying out in an autonomous manner, functions of:
   installing new loading units;
   controlling and implementing security policy rules by attributing and controlling access rights in accordance with the confidentiality level of each loading unit;
   maintaining a current status and integrity of a system in accordance with components of the operating system and loading units; and
   verifying the restrictions defined by a data structure of installation restrictions, associated with each loading unit,
   wherein the security module is an autonomous security module separate from each of the loading units.

9. The data-processing unit according to claim 8, wherein the security module, following the installation of this module, provides autonomous control at least of the steps of:
   changing an internal status of the system;
   requesting access to system resources; and
   requesting installation of each loading unit on the system.

10. The data-processing unit according to claim 9, wherein, in addition to absolute and relative information, the security module controls any new event listed in a dynamic data structure representative of the current status of an operating system unit, the security module controlling and updating a variable of a current confidentiality level of the system in accordance with events which arise comprising detection of an attack, modification of a confidentiality status after installing and uninstalling a loading unit.

11. The data-processing unit according to claim 9, wherein, upon a request for installation of a loading unit, the security module performs verification of conditions relating to an identity of the loading unit, based on an information data structure for identification of the loading unit, the verification comprises:
   verifying, based on the identifier thereof, that a site of origin which accommodates the loading unit is included amongst authorized sites;
   verifying a certificate for authentication of the identity of the loading unit;
   verifying the integrity of the loading unit;
   verifying, with reference to a minimum level of confidentiality, that the confidentiality level associated with the loading unit does not prohibit the installation of the loading unit;
   verifying, with reference to a list of prohibited functionalities, that the functionality of the loading unit does not belong to the list and does not prohibit the installation of the loading unit; and
   verifying, based on the identifier of the site of origin which accommodates the loading unit, that the identity of a distributor of the loading unit does not prohibit the installation of the loading unit.

12. The data-processing unit according to claim 9, wherein, following a request for installation of a loading unit and in presence of a non-empty list of installation restrictions, the security module further carries out:
   a call to a point of entry of the loading unit in order to execute a plurality of verification operations specific to the loading unit comprising at least one of verification of integrity of data and portions of a code of the loading unit, initialization of specific data of the loading unit; and
   verifying the presence of the components in the system or in the loading unit corresponding to positive attributes and an absence of components or a loading unit corresponding to negative attributes.

13. The data-processing unit according to claim 12, wherein verification in the presence of the non-empty list of installation restrictions involves direct verification of the installation restrictions based on at least one of a plurality of lists of restrictions attached to different loading units and indirect verification based on a delegation of authorization of installation restriction rules which are obtained by means of resolution.

14. The data-processing unit according to claim 9, wherein, upon a request for installation of a loading unit and a data structure which constitutes a non-empty group of security policy rules being present, the security module carries out verification of acceptability of the requests from the loading unit, the requests being able to comprise requests for access to resources of the system and a list of loading units which are capable of calling at least one of corresponding points of entry.

15. The data-processing unit according to claim 13, wherein, when the verification of the installation restrictions is carried out by means of the indirect verification based on a delegation of translation authorization, the security module carries out the resolution of the rules relating to the loading unit which is conditional and which is subject to indirect verification, in order to determine acceptability of the requests from the loading unit which is conditional.

16. The data-processing unit according to claim 8, wherein, following verification of a true value of all preceding verification operations, the security module authorizes the installation of the loading unit, under the authority of the central processing unit of the data-processing unit, otherwise, in an absence of verification of a true value of one of the preceding verification operations, the security module prohibits the installation of the loading unit, the prohibition of the installation being able to bring about a signal at a man/machine interface associated with the processing unit.

17. The data-processing unit according to claim 8, wherein the security module is installed in the secure physical zone by means of the secure core of the operating system, the installed security module being verified in terms of its integrity by an integrity verification mechanism during a starting sequence of the processing unit.

18. A method for loading, verifying and executing a plurality of loading units in a data processing-unit, the method comprising:

associating, via a programmed processor, a plurality of data structures defining identification information, installation restriction requirements and policy requests for each loading unit of the plurality of loading units, said associating step performed by an autonomous security module separate from each of the loading units;

updating, via the programmed processor, a current security status of the data-processing unit upon a change of an internal status of the data-processing unit, said updating step performed by the autonomous security module separate from each of the loading units;

validating, via the programmed processor, the loading unit by comparing the installation restriction requirements with the current security status of the data-processing unit and the policy requests with system resources of the data-processing unit, said validating step performed by the autonomous security module separate from each of the loading units; and loading and executing, via the programmed processor, the loading unit, the loading and executing of the loading unit changes the internal status of the data-processing unit, said load and executing step performed by the autonomous security module separate from each of the loading units.

* * * * *

UNITED STATES PATENT AND TRADEMARK OFFICE
CERTIFICATE OF CORRECTION

PATENT NO. : 8,543,997 B2 Page 1 of 1
APPLICATION NO. : 11/794481
DATED : September 24, 2013
INVENTOR(S) : Leporini et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1694 days.

Signed and Sealed this
Fifteenth Day of September, 2015

Michelle K. Lee
*Director of the United States Patent and Trademark Office*